A. C. JOHNSTON.
APPARATUS FOR TRANSFERRING MATERIAL FROM A HIGH TO A LOWER LEVEL.
APPLICATION FILED JAN. 30, 1907.
942,449.
Patented Dec. 7, 1909.
5 SHEETS—SHEET 1.
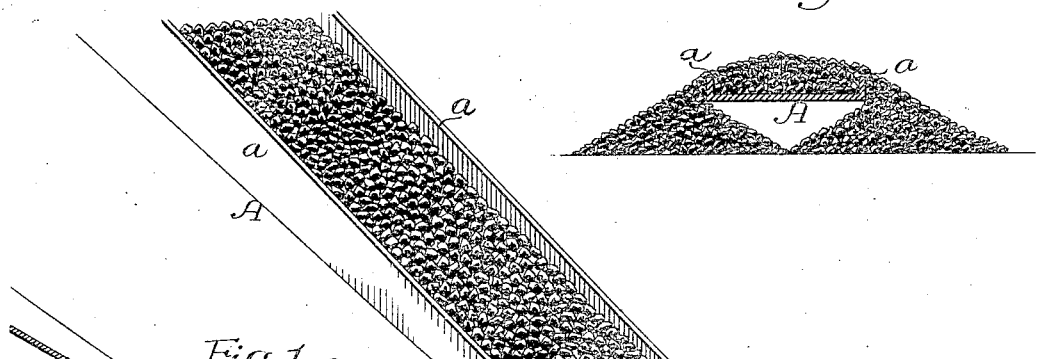
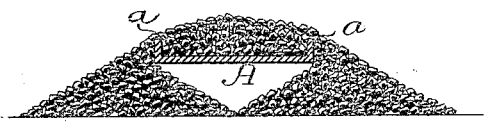
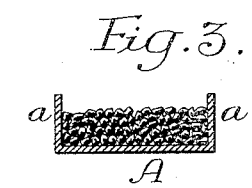
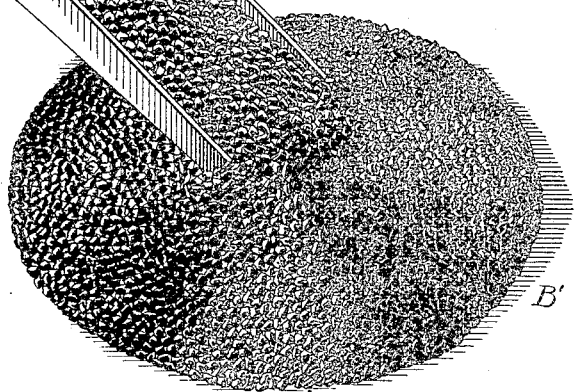
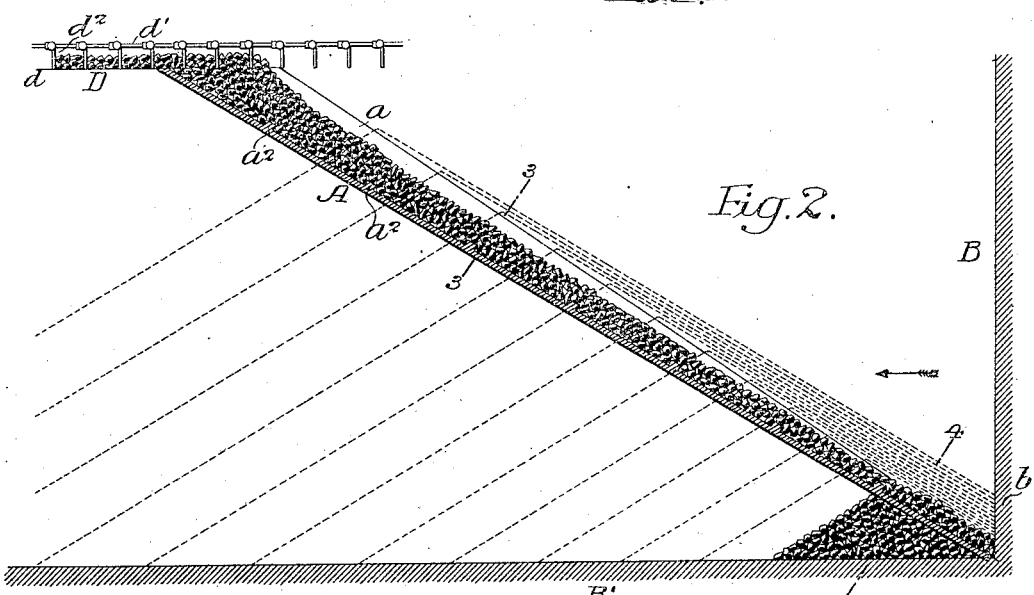

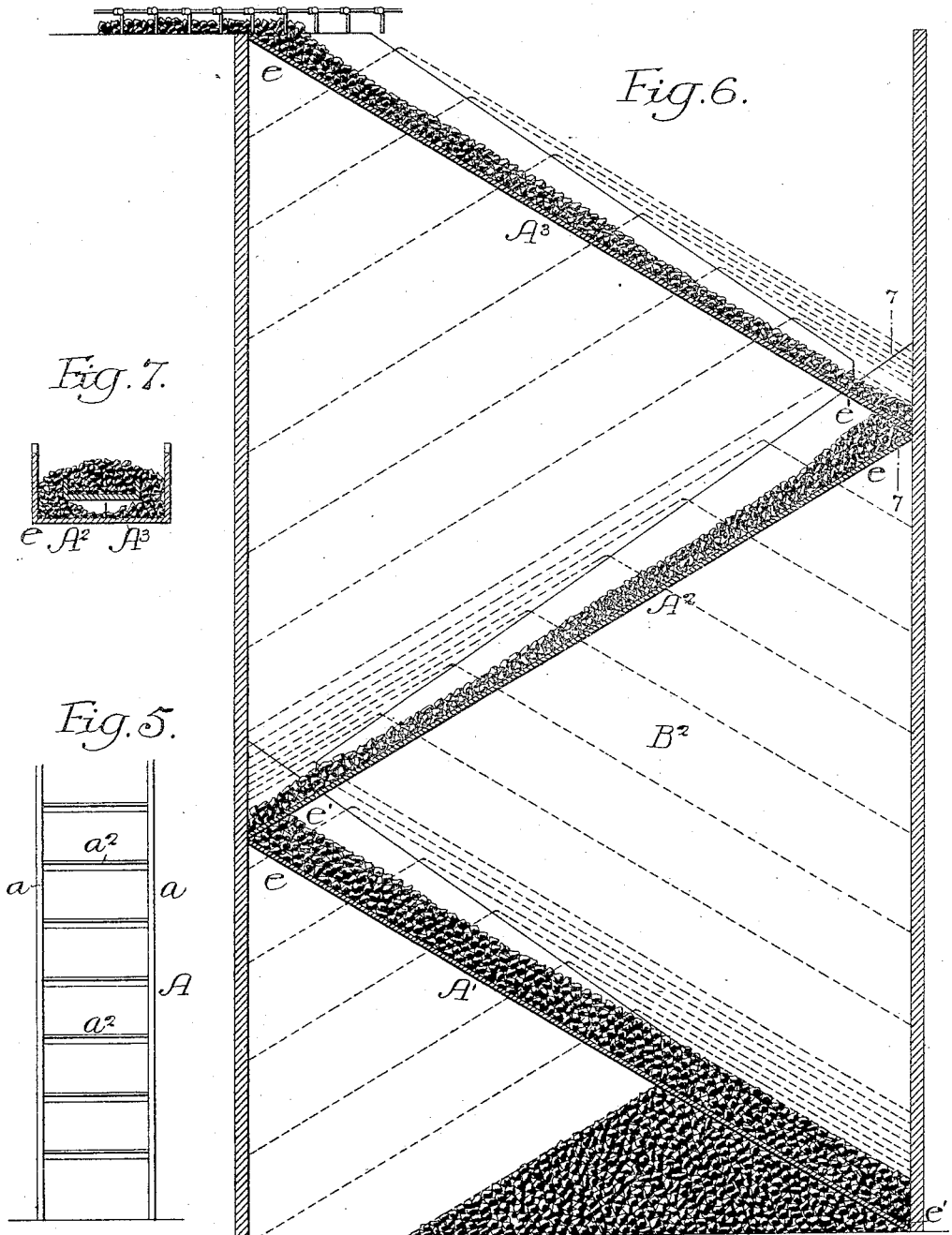

A. C. JOHNSTON.
APPARATUS FOR TRANSFERRING MATERIAL FROM A HIGH TO A LOWER LEVEL.
APPLICATION FILED JAN. 30, 1907.
942,449.
Patented Dec. 7, 1909.
5 SHEETS—SHEET 3.
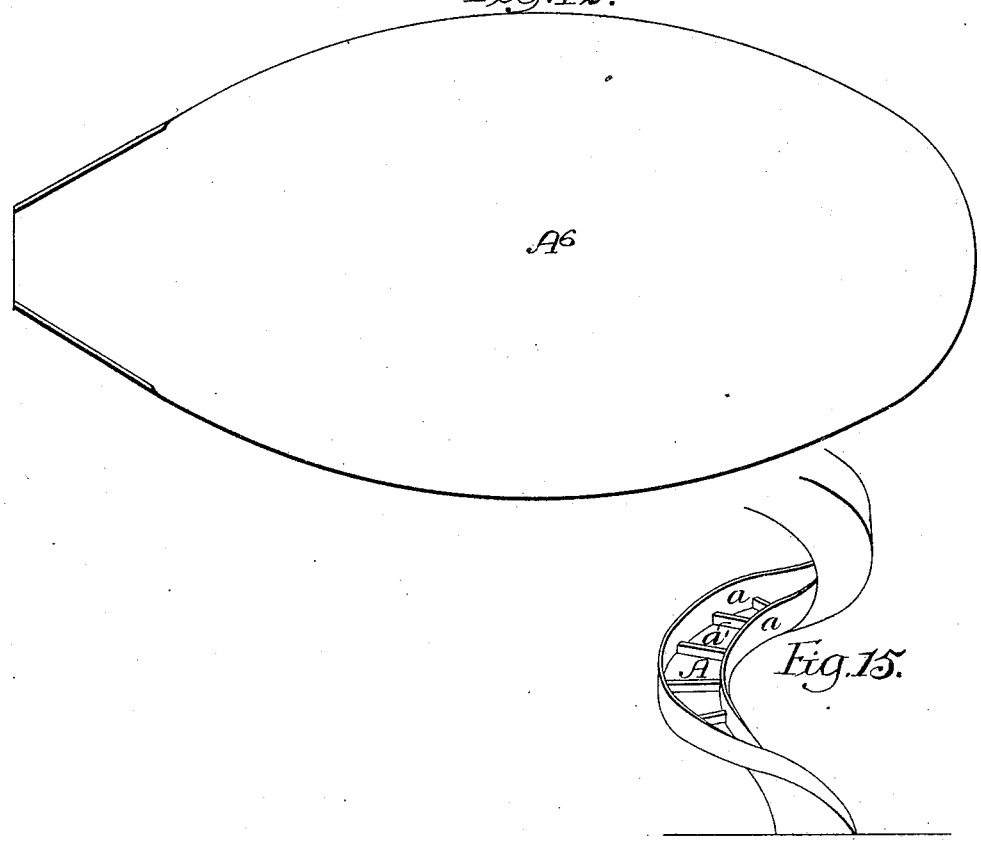
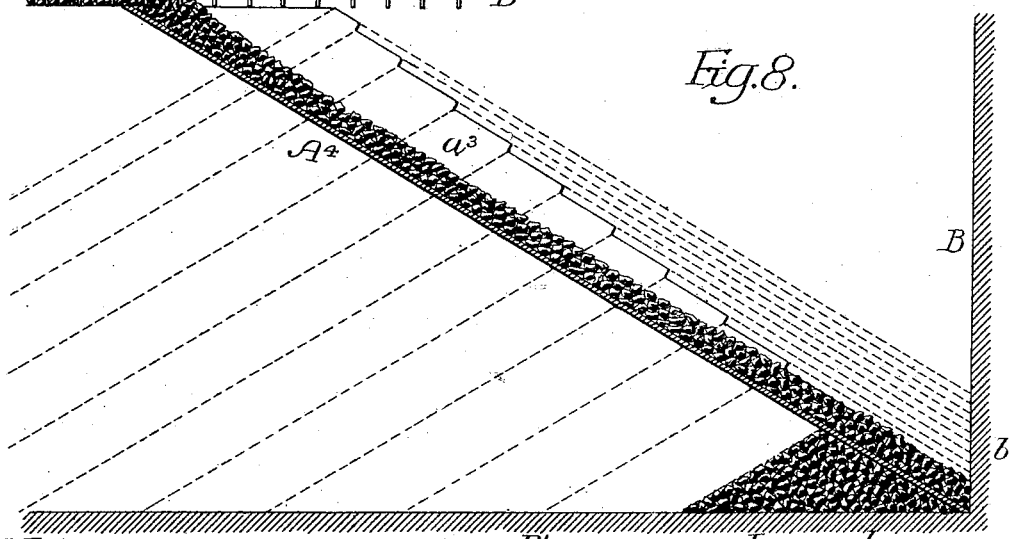

A. C. JOHNSTON.
APPARATUS FOR TRANSFERRING MATERIAL FROM A HIGH TO A LOWER LEVEL.
APPLICATION FILED JAN. 30, 1907.

942,449.

Patented Dec. 7, 1909.
5 SHEETS—SHEET 4.

A. C. JOHNSTON.
APPARATUS FOR TRANSFERRING MATERIAL FROM A HIGH TO A LOWER LEVEL.
APPLICATION FILED JAN. 30, 1907.
942,449.
Patented Dec. 7, 1909.
5 SHEETS—SHEET 5.
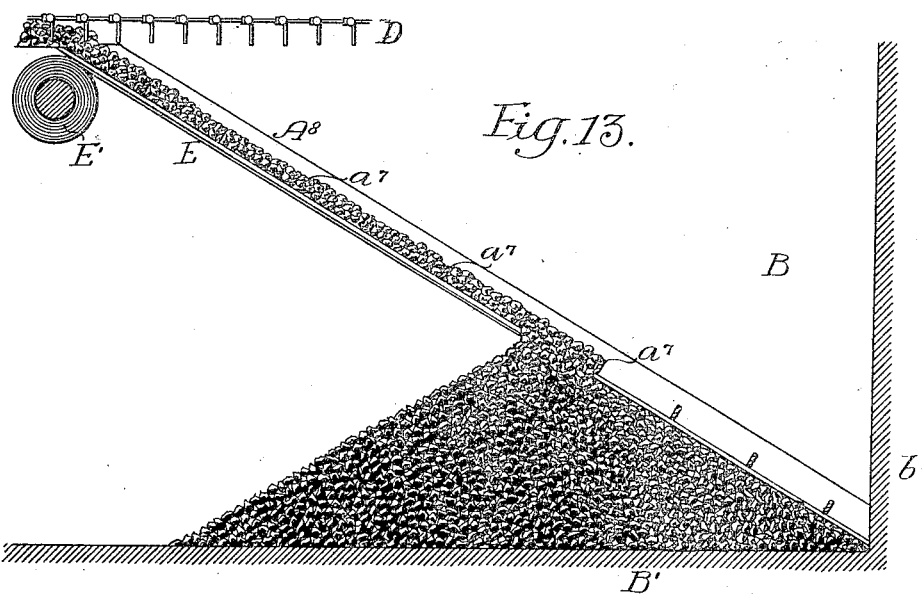
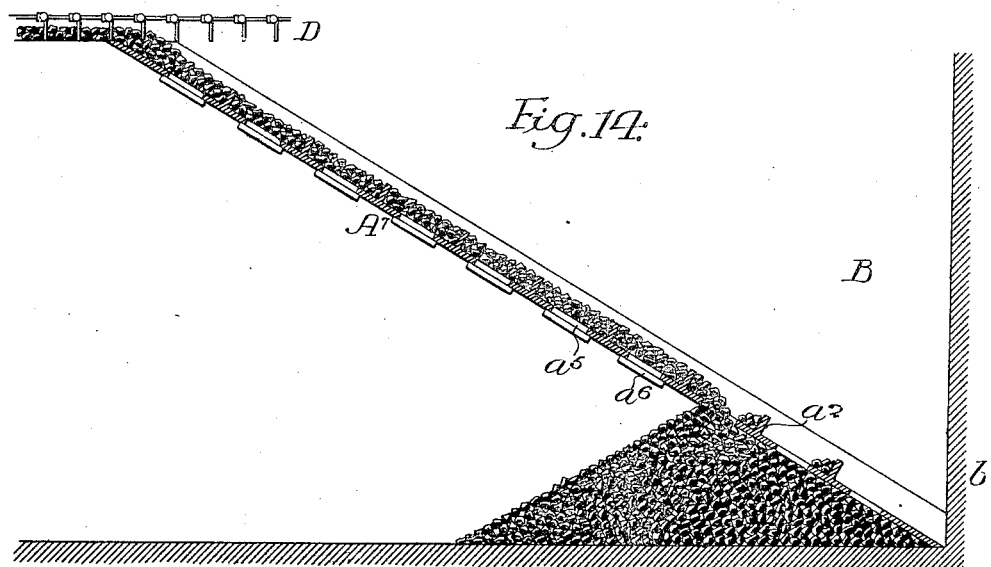
Witnesses:—
Augustus B. Coppes
Titus H. Iron.
Inventor.
Arthur C. Johnston.
by his Attorneys,
Howson Howson

UNITED STATES PATENT OFFICE.

ARTHUR C. JOHNSTON, OF WYNCOTE, PENNSYLVANIA, ASSIGNOR TO DODGE COAL STORAGE COMPANY, OF NAUGATUCK, CONNECTICUT, A CORPORATION OF CONNECTICUT.

APPARATUS FOR TRANSFERRING MATERIAL FROM A HIGH TO A LOWER LEVEL.

942,449.        Specification of Letters Patent.        Patented Dec. 7, 1909.

Application filed January 30, 1907. Serial No. 354,856.

*To all whom it may concern:*

Be it known that I, ARTHUR C. JOHNSTON, a citizen of the United States, residing at Wyncote, Pennsylvania, have invented certain Improvements in Apparatus for Transferring Material from a High to a Lower Level, of which the following is a specification.

The object of my invention is to prevent the breakage to any appreciable extent of frangible material as it is transferred from a high to a lower level.

My invention relates to certain improvements in apparatus broadly claimed in an application for patent filed by me on the 29th day of January, 1907.

In the accompanying drawings: Figure 1, is a perspective view of the lower end of a chute, showing a pile being formed, illustrating my invention; Fig. 1$^x$, is a sectional view of the lower end of the chute illustrated in Fig. 1; Fig. 2, is a longitudinal sectional view through the chute shown in Fig. 1, situated in a bin; Fig. 3, is a transverse sectional view of the chute on the line 3—3, Fig. 2; Fig. 4, is a transverse sectional view through the chute on the line 4—4, Fig. 2; Fig. 5, is a face view of the chute looking in the direction of the arrow, Fig. 2, without the material; Fig. 6, is a vertical sectional view of a bin, showing a series of the chutes of the form illustrated in Fig. 2, mounted therein and arranged for piling material within the bin; Fig. 7, is a sectional view on the line 7—7, Fig. 6; Fig. 8, is a longitudinal sectional view of a modification, illustrating the sides of a chute stepped; Figs. 9, 10, 11, 12, 13 and 14, are views of modifications of the invention; and Fig. 15, is a view of my invention applied to a spiral chute.

Referring in the first instance to Figs. 1 to 5, inclusive, A is a chute arranged at an angle somewhat less than the angle of repose of the material to be piled. This chute has sides $a$—$a$, which, in the present instance, are higher at the upper end than at the lower end and gradually taper from one point to the other.

In Fig. 2, I have shown the chute mounted within a bin B, having a piling floor B′. The chute extends, in this instance, to the vertical wall $b$ of the bin and this wall acts as an abutment—the purpose of which will be described hereafter.

D is a conveyer discharging into the upper end of the chute A and, in the present instance, consists of a trough $d$, an endless chain $d'$, and flights $d^2$, although any suitable type of conveying apparatus may be used to feed the material to the inclined chute. I have shown coal as the material to be transferred from the high to the lower level and to be piled in the bin, as illustrated in Fig. 2. The coal is delivered to the chute A by the conveyer and travels down the chute until it reaches the abutment $b$, then the material commences to back up on the chute until the entire bottom of the chute is covered with particles of coal which form a roughened surface. An abutment is necessary to cause the material to lodge on the surface of the chute, this abutment may be the floor or the wall $b$ of the bin, or a transverse rib $a'$ at the base of the chute as in Fig. 1$^x$, or a series of transverse ribs $a^2$ may extend at intervals across the chute as illustrated in Figs. 2 to 5, to form pockets to hold the frangible material which forms the roughened surface. I prefer to use the ribs $a^2$ in order to prevent avalanching should a large body of material be discharged upon the chute at once. It will be noticed that the material will flow over the roughened surface of the chute, rolling and sliding without material drop and when it reaches the abutment at the floor it will accumulate until it flows over the abutment and over the sides forming an initial pile, and as the pile increases in height the apex will move toward the point of supply and the depth of the body of coal within the chute will be increased, depending upon the height of the sides $a$—$a$ of the chute at the apex of the pile, as indicated by the diagrammatic dotted lines in Fig. 2. Thus in time the pile will be of such height as to embed the chute. When the apex of the pile reaches the conveyer D, then the pile may be elongated as the coal will then be discharged upon the pile already formed and the point of discharge will more forward as the pile increases in length; thus filling the entire bin, or, if a bin is not used, increasing the area of coal on the piling floor.

In Fig. 6, I have shown my invention mounted in a deep bin for storing coal or other frangible material. The bin B, in this instance, is narrow in comparison to its height and a single chute arranged at the angle shown would not deliver material from the upper end of the bin to the piling floor B' without disintegrating the material, therefore, I have arranged, in the present instance, three chutes A', A² and A³; each chute being wider at the upper end $e$ than at the lower end $e'$. The lower end $e'$ of the chute A³ extends into the upper end $e$ of the chute A², and the same is the case with the chutes A² and A'. The object of this construction is to allow the material as it flows down the upper chute to flow over the sides of the said chute onto the chute below it without material drop; so that there is a continuous rolling and sliding of the material from the point where it is discharged on to the upper chute to the piling floor or to the apex of the pile being formed. The bin will be filled in the manner indicated in dotted lines, first, the material embedding the chute A', then embedding the chute A² and finally embedding the chute A³.

Fig. 8, is a view of a modification in which the sides $a^3$ of the chute A⁴ are stepped; the sides being higher at the upper end of the chute than at the lower end, and the material instead of discharging gradually over the sides of the chute, as in Fig. 2, will discharge at intervals according to the length of the steps.

In the chute illustrated in Fig. 9, the sides $a^4$ of the chute A⁵ are made up of a series of sections, either removable or hinged in order to be turned down, so that when the apex of the pile reaches a given point a section is removed or turned down, allowing the material to flow laterally over the sides of the chute.

Figs. 10, 11 and 12, show a chute A⁶ in which the sides are dispensed with, but in this instance the chute has to be so shaped, as shown in the plan view of Fig. 12, that a certain body of material will remain upon the chute and when this body increases in height the surplus will flow over the edges of the chute, as shown in Fig. 11.

In Fig. 14, I have shown a chute A⁷, having a series of openings $a^5$ in the bottom and these openings are closed by doors $a^6$, which may be mounted in any suitable manner. The abutments $a^2$, in this instance, are arranged below each opening, so that when the opening is uncovered the coal will flow through the opening and that part of the coal previously retained in the chute will be discharged on the coal overflowing the roughened bed. The coal will in this manner be progressively piled.

In Fig. 13, I have shown the chute A⁸, having an opening $a^7$ throughout its entire length and, in this instance, I close the opening by a ribbon E adapted to guides on the under side of the chute. The material flows over the end of the ribbon onto the piling floor or onto the pile. The ribbon is wound upon a drum E' at the upper end of the chute and the cross ribs $a^2$ are carried in the present instance by the side members. As the pile increases in height the ribbon is coiled upon the drum to move the discharge point. In Fig. 15, I have shown my invention as applied to a spiral chute, this form is especially desirable when the material must be transferred through a comparatively narrow space.

It will be seen that in all of the above types of chutes the material to be transferred from a high to a lower level is allowed to flow over a roughened surface formed by the material itself and the bed forming the roughened surface is at or about the angle of repose of the material being transferred, so that there is a continuous rolling and sliding of the material over the roughened surface and the flow is retarded to such an extent as to prevent breakage to any appreciable extent.

My invention is particularly adapted for use in piling coal upon piling floors or in bins, as coal when allowed to drop even a short distance will oftentimes be broken to such an extent that screening is necessary, but by the use of my invention there is no material drop of the coal as it passes over the inclined roughened surface and even when it passes from one chute to the other, as shown in Fig. 6, the material simply rolls over the sides of the upper chute onto the body of material in the lower chute, and while my invention is particularly adapted for piling or transferring coal, it can be used for transferring or piling any other frangible material.

While I have shown in Figs. 1 and 2 and some of the other figures, the body of the chute arranged at an angle a little less than the angle of repose of the material to be piled, in some instances it may be arranged at a greater angle than the angle of repose of the material, but in all cases, in this instance, the roughened surface formed on the body of the chute is at the angle of repose of the material to be piled and any material discharged onto this surface will flow over the surface at a retarded speed and will not be disintegrated to any appreciable extent.

I claim:—

1. A chute arranged at an incline, said chute having sides higher at the upper end than at the lower end, an abutment for retaining a body of material in the chute at the angle of repose of said material so that when additional material is discharged onto the chute, said material held by the abutment will form a roughened surface to retard the flow of said material thus preventing breakage of the material to any appreciable extent, substantially as described.

2. The combination of a bin having a piling floor, two or more chutes arranged at an incline one above another, one chute discharging into another, each chute having an abutment at its lower end, side members and a roughened surface, said chutes being so arranged that material flowing over the roughened surface of one chute will flow down to the abutment and will then flow laterally from the sides of said chute on to the roughened surface of the chute directly below it, substantially as described.

3. The combination of a bin having a piling floor, two or more chutes arranged in zigzag form above the piling floor, said chutes having side members and being wider at the upper end than at the lower end, so that the lower end of one chute can overflow into the upper end of the other chute, each chute having a roughened surface, an abutment at the lower end of each chute so that when the material is discharged on to the chutes it will flow over the roughened surface and the abutments will cause the material to flow laterally over the side members of the upper chute on to the widened portion of the chute directly below it, substantially as described.

4. The combination of a bin, a series of chutes mounted in the bin, one chute being arranged at a higher level than another, the body of each chute being less in width at the lower end than at the upper end, the lower end of one chute being extended into the upper end of the chute next below it, the sides of the chutes being higher at the upper end than at the lower end, an abutment for each chute, the whole being so combined that material discharged into the upper chute will be held by the abutment to form a roughened bed over which other material must flow, the same continuing throughout the several chutes so that material as it is discharged into the bin will flow over the several chutes to the piling floor, or to the apex of the pile being formed without breakage to an appreciable extent, substantially as described.

In testimony whereof, I have signed my name to this specification, in the presence of two subscribing witnesses.

ARTHUR C. JOHNSTON.

Witnesses:
  WM. E. SHUPE,
  WM. A. BARR.